United States Patent [19]

Poletto

[11] Patent Number: 5,180,927
[45] Date of Patent: Jan. 19, 1993

[54] RESET DEVICE FOR MICROPROCESSOR, PARTICULARLY FOR AUTOMOTIVE APPLICATIONS

[75] Inventor: Vanni Poletto, Camino, Italy

[73] Assignee: SGS-Thomson Microelectronics S.r.l., Agrate Brianza, Italy

[21] Appl. No.: 794,939

[22] Filed: Nov. 20, 1991

[30] Foreign Application Priority Data

Nov. 20, 1990 [IT] Italy ................................ 67907 A/90

[51] Int. Cl.$^5$ ..................... G11C 11/00; H03K 3/01
[52] U.S. Cl. ........................ 307/272.3; 307/296.4; 307/359
[58] Field of Search .................. 307/272.3, 350, 359, 307/296.4

[56] References Cited

U.S. PATENT DOCUMENTS 4,433,390 2/1984 Carp et al. ..................... 307/272.3
4,572,966 2/1986 Hepworth ..................... 307/272.3

FOREIGN PATENT DOCUMENTS 0063231 4/1983 Japan ........................... 307/272.3

Primary Examiner—William L. Sikes
Assistant Examiner—Toan Tran
Attorney, Agent, or Firm—Oblon, Spivak, McClelland, Maier & Neustadt

[57] ABSTRACT

A microprocessor reset device comprising a first comparator which, when the input signal of the device falls below a first threshold, closes a switch controlling discharging of a condenser. A second comparator connected to the condenser enables the reset signal when its input signal, correlated with the voltage of the condenser, falls below a seond threshold. For enabling of the reset signal to be dependent on both the duration of the reduction in the input signal below the first threshold, as measured by the voltage present at the terminals of the condenser, as well as on the amount of reduction, the input signal of the second comparator consists of a linear combination of the input signal and the voltage of the condenser, effected by an adding element.

10 Claims, 2 Drawing Sheets

RESET DEVICE FOR MICROPROCESSOR, PARTICULARLY FOR AUTOMOTIVE APPLICATIONS

BACKGROUND OF THE INVENTION

The present invention relates to a reset device for microprocessor, particularly for automotive applications.

Cars are receptacles for an enormous amount of disturbance, much of which originating in the electrical equipment on the car itself, and caused, for example, by on-off operation of various types of inductive loads (ignition coils, injectors, relays) or resistive loads (lights). Nor are they immune to additional external disturbance, such as that caused by radio and television transmitters and repeaters.

As car become more and more sophisticated electronically, such an unfavourable environment cannot be ignored by the designer. In the case of microprocessor systems, in particular, strict control is required of the supply voltage which, usually 5 V, is tapped from the battery voltage by means of a voltage regulator which, regardless of performance, cannot possibly guarantee correct operation under all working conditions.

The purpose behind such control of the supply voltage is to disable operation of the microprocessor in conditions in which it cannot operate reliably. The information for disabling the microprocessor is supplied to it in the form of a reset signal supplied by what is known as a reset device.

At present, reset circuits consist of two comparators and a capacitance, as shown in FIG. 3. The input voltage $V_{IN}$ from the voltage regulator is supplied to one input of comparator 1, the other input of which is connected to a threshold voltage $TH_1$ usually close to the nominal value of $V_{IN}$ (e.g. 4.6 V). Comparator 1 provides for monitoring voltage $V_{IN}$ and, upon this falling below threshold $TH_1$, closes switch 2 for grounding condenser 4, which is thus discharged via resistor 3. If voltage $V_{IN}$ remains below threshold $TH_1$, after a time depending on time constant RC (where R is the resistance of resistor 3, and C the capacitance of condenser 4), the voltage of condenser 4 falls below a second threshold $Th_2$, e.g. 4 V, thus switching a second comparator 5, the output of which constitutes the reset signal. Downward switching of the reset signal provides for disabling the microprocessor connected downstream from second comparator 5.

When input voltage $V_{IN}$ again exceeds threshold $Th_1$, switch 2 opens and condenser 4 is charged to voltage $V_{cc}$ by current I supplied by current source 6. After a given time (proportional to $Th_2*C/I$, if the condenser is fully discharged), the voltage of condenser 4 gradually exceeds $Th_2$, and the output of comparator 5 again switches to high for enabling normal operation of the microprocessor. The purpose of the delay in disabling the reset signal is to give the microprocessor time to stabilize its internal circuits upon the supply voltage being restored.

On the above circuit, no indication is given in the event of a brief fall in input voltage not affecting operation of the microprocessor. That is, in the event of input voltage $V_{IN}$ falling below threshold $Th_1$, but being restored rapidly, before the voltage of condenser 4, as its is discharged, falls below second threshold $Th_2$, no switching occurs of second comparator 5, in which case, the voltage of condenser 4 returns to $V_{cc}$, and the reset signal remains high, with no interruption in the operation of the microprocessor.

In short, the FIG. 3 circuit:
a) enables the reset signal, if the input voltage falls below threshold $Th_1$ for longer than a minimum time $T_m = RC*\ln(V_{cc}/Th_2)$;
b) disables the reset signal with a delay of $Th_2*C/I$ upon $V_{In}$ again exceeding threshold $Th_1$;
c) is insensitive to events resulting in $V_{IN}$ falling below first threshold $Th_1$ for very short periods of time of less than $T_m$.

The above known circuit presents a number of drawbacks, foremost of which is that the reset signal is enabled solely on the basis of how long the input voltage remains below the first threshold. The capacity of a microprocessor to withstand a fall in voltage, however, depends not only on the duration but also on the amount by which the voltage falls in relation to the nominal value.

A further drawback of the above known circuit is that it lacks precision as regards the delay with which the reset signal is disabled. The condenser, in fact, continues discharging as long as the input voltage $V_{IN}$ remains below first threshold $Th_1$. The time required for charging the condenser to second threshold $Th_2$ obviously depends on the voltage of the condenser when charging commences, which voltage may be zero or anywhere between zero and $Th_2$, depending on whether the fall in voltage is of long or short duration respectively. This obviously results in imprecision as regards the time required for charging the condenser to threshold $Th_2$ and disabling the reset signal.

Finally, another drawback of the above known circuit is the slowness with which the condenser is charged by current I. Consequently, in the event of a further fall in input voltage before the condenser has been fully charged, the voltage of the condenser falls as of the value reached by tat time, thus enabling the reset signal in advance. This is especially troublesome in cases where the first fall in input voltage below the first threshold is so short as to keep the condenser above the second threshold (thus failing to enable the reset signal), and a further fall in input voltage occurs before the condenser is fully charged. In this case, the reset signal may be enabled by the sum of the two reductions in input voltage, even though the duration of these, taken singly, would be too short to enable the reset output.

SUMMARY OF THE INVENTION

It is an object of the present invention to provide a reset device wherein enabling of the reset signal depends not only on the duration but also on the amount by which the input voltage to the device falls in relation to the nominal value.

According to the present invention, there is provided a reset device for microprocessor, particularly for automotive applications, defining an input terminal and an output terminal, and comprising a first comparing stage input-connected to said input terminal and to a first source of a first threshold signal; a switch controlled by said first comparing stage, for switching between a closed and an open state; a capacitive element charged and discharged depending on the state of said switch; and a second comparing stage input-connected to said capacitive element and to a second source of a second threshold signal, for generating a reset signal having two different logic states and supplied to said output terminal; characterised by an adding element input-connected to said input terminal and to said capacitive element, and output-connected to said second comparing stage.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
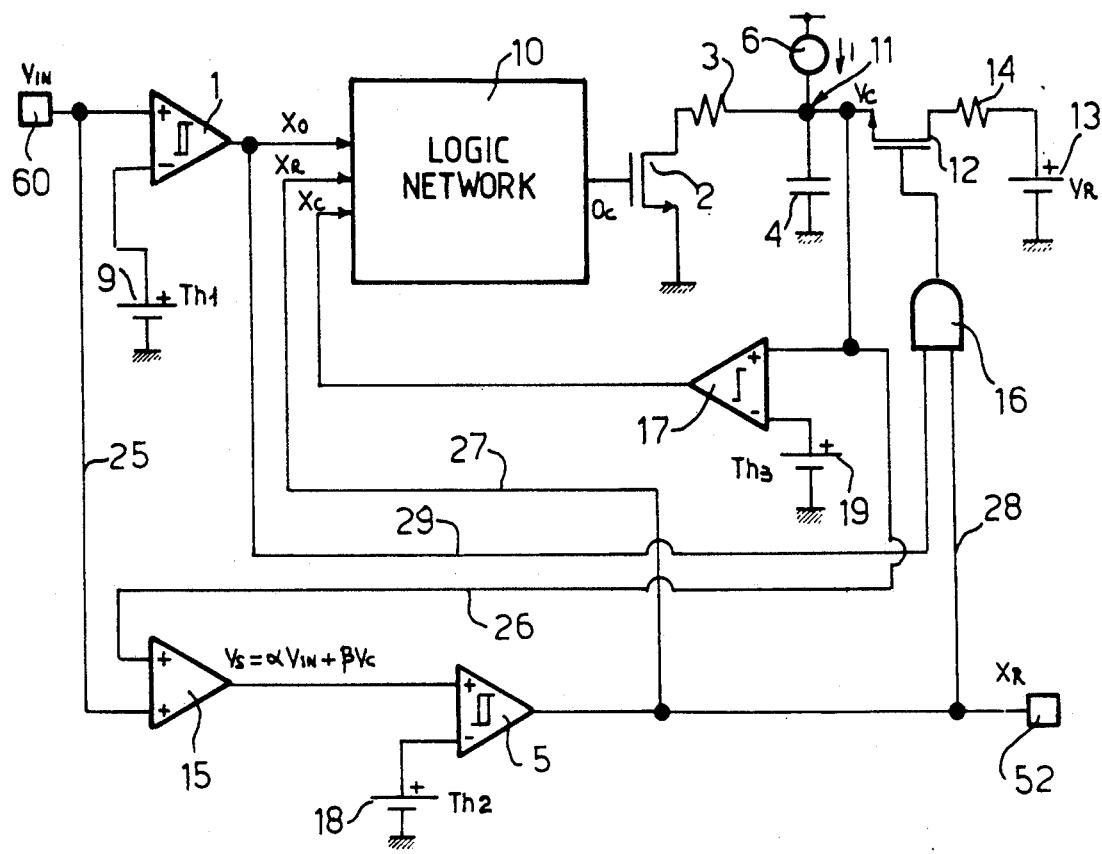
FIG. 1 shows a simplified electrical diagram of the reset device according to the present invention.
Figure 3:
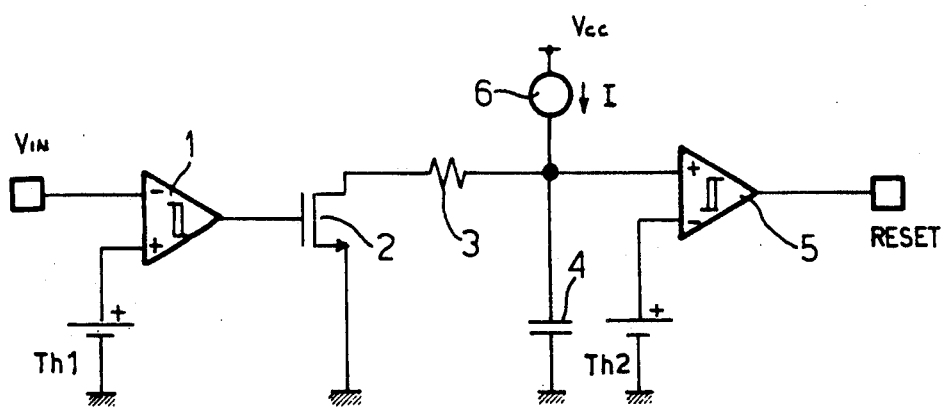
FIG. 3 shows a simplified electrical diagram of a known reset circuit.

With reference to FIG. 1, in which the parts common to the known circuit in FIG. 3 are shown using the same numbering system, the reset device according to the present invention comprises an input comparator 1 having a non-inverting input supplied with input voltage $V_{IN}$, and an inverting input connected to a voltage source 9 supplying a first threshold voltage $Th_1$ of, for example, 4.6 V. The output of comparator 1, at which logic signal $x_O$ is present, is connected to the input of a sequential logic network 10 with a memory, the $o_c$ signal output of which is connected to the control terminal of a switch 2 located between a reference potential line (ground) and a first terminal of a resistor 3. The other terminal of resistor 3 is connected, at point 11, to one terminal of a condenser 4, the other terminal of which is grounded. A current source 6 is located between point 11 and a second reference potential line of, say, 5 V; and a switch 12 is located between point 11 and a voltage source 13 (generating voltage $V_R$ of, say, 1.2 V) with the interposition of a resistor 14.

Input voltage $V_{IN}$ is also supplied over line 25 to one input of an adder 15, the other input of which is connected to point 11 over line 26 and therefore receives voltage $V_c$ of condenser 4. Adder 15 performs a linear combination of the two voltages, and supplied a voltage signal of $V_2 = \alpha V_{IN} + \beta V_c$ to the non-inverting input of a second comparator 5, the other (inverting) input of which is connected to a voltage source 18 supplying a second threshold voltage $Th_2$ of, say, 1.2 V. The output of comparator 5, at which reset signal $x_R$ supplied to output terminal 52 of the device is present, is connected over line 27 to one input of logic network 10 and, over line 28, to one input of an AND circuit 16, the other input of which is connected over line 29 to the output of first comparator 1, and therefore receives signal $x_o$. The output of AND circuit 16 is connected to the control terminal of switch 12 for opening and closing the switch.

The FIG. 1 device also comprises a third comparator 17, the non-inverting input of which is connected to point 11 and receives voltage $V_c$; and the inverting input of which is connected to a further voltage source 19 supplying a third threshold voltage $Th_3$ of, say, 20 mV.

The $x_c$ signal output of comparator 17 is connected to one input of logic network 10.

The logic network implements the following function: when $x_o$ switches from 1 to 0, $o_c$ switches form 0 to 1; when $x_o$ switches form 0 to 1, with $x_R=0$ and $x_C=0$, r with $x_R=1$ and $x_C=1$, output $O_c$ switches from 1 to 0. Conversely, when $x_O$ switches from 0 to 1, with $x_R=0$ and $x_C=1$, output $O_C$ remains $=1$. In the latter case, upon $x_C$ switching from 1 to 0, output $o_C$ switches from 1 to 0, and remains low even after $x_R$ and $x_C$ switch from 0 to 1.

The FIG. 1 device operates as follows.

Input voltage $V_{IN}$ is monitored by comparator 1, which compares it with first threshold $Th_1$. A long as the input voltage remains above the first threshold, signal $x_O$ remains high, thus keeping switch 2 open and switch 12 closed via circuit 16; condenser 4 is charged to the voltage of source 13 (1.2 V); the output of comparator 5 is high; and signal $x_R$ is disabled (high).

When input voltage $V_{IN}$ falls below first threshold $Th_1$, this switches signal $x_O$ which, via logic network 10, closes switch 2 and opens switch 12, thus discharging condenser 4 via resistor 3 and switch 2. Adder 15 performs a weighted addition of input voltage $V_{IN}$ and the condenser voltage $V_C$, to give voltage $V_S$, which is supplied to comparator 5 for comparison with second threshold $Th_2$. The output of comparator 5 thus depends on both the amount (term $\alpha V_{IN}$) and the duration of the fall in supply voltage (term $\beta V_C$, which is a function of the duration of even $V_{IN}<Th_1$). That is, for a slight fall in input voltage in relation to the nominal value, comparator 5 is only switched by very low $V_C$ values, i.e. after a relatively long time; whereas, for a substantial fall in input voltage in relation to the nominal value, comparator 5 is switched by a smaller $V_c$ voltage value, i.e. a substantial fall in input voltage for a relatively short time is sufficient to enable reset signal $V_R$. The linear combination of the input and condenser voltages obviously provides for taking into account all the intermediate situations.

Logic network 10 is informed of the low (enabled) state of reset signal $x_R$ over line 27, and keeps switch 2 closed as long as condenser voltage $V_C$ remains above third threshold $Th_3$. In this way, even if the input voltage falls rapidly, enough to cause a reset, and then moves back up over threshold $Th_1$, the condenser continues discharging until voltage $V_C$ reaches threshold $Th_3$, as detected by comparator 17, which informs logic network 10 by switching signal $x_C$ to low. At this point, logic network 10 opens switch 2, and condenser 4 begins charging, via current source 6, from a known starting voltage corresponding to third threshold $Th_3$ and very close to zero (20 mV). When condenser voltage $V_C$ reaches such a value that the output voltage $V_S$ of adder 15 exceeds second threshold $Th_2$, the reset signal switches to high (i.e. is disabled). Consequently, the condenser is charged over a practically constant time period, thus eliminating any uncertainty as to the delay with which the reset signal is disabled.

If, on the other hand, input voltage $V_{IN}$ falls below first threshold $Th_1$, thus switching $x_o$ from 1 to 0, but without switching reset signal $X_R$ which remains high, when the input voltage once more rises above the first threshold, signal $x_o$ also switches to high, and AND circuit 16 receives two high signals. The AND circuit therefore switches and closes switch 12, which connects condenser 4, which is partially discharged due to the fall in input voltage, to the $V_R$ voltage source of, say, 1.2 V. If resistor 14 is small enough, condenser 4 may be charged rapidly enough to enable it, as of the fully charged condition, to cater to a further fall in input voltage, even closely following the first, and so measure the duration of each fall in voltage singly, thus eliminating the drawback posed by the known circuit.

Figure 2:
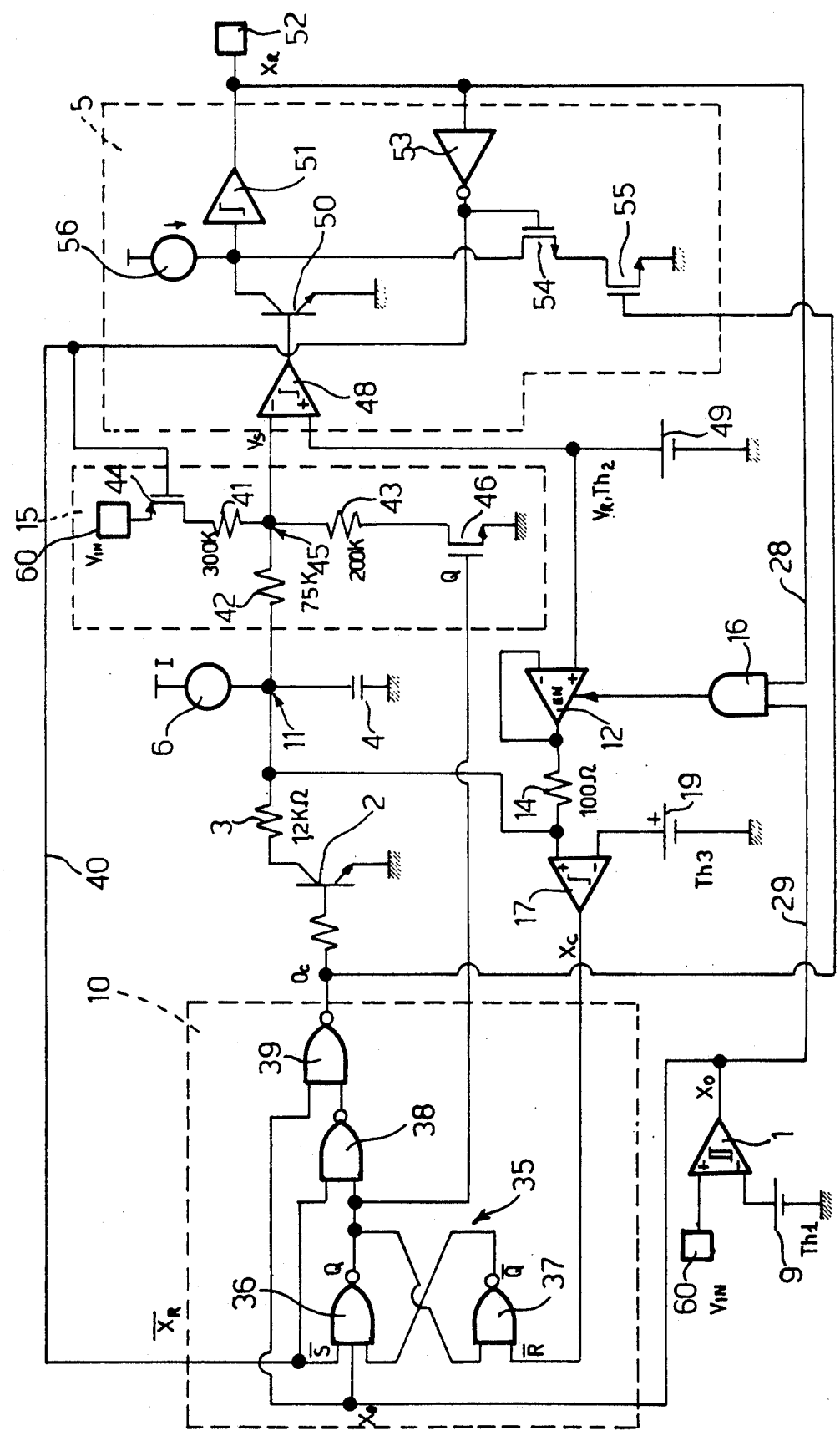
FIG. 2 shows a more detailed electrical diagram of the FIG. 1 device.

FIG. 2 shows a more detailed diagram of the FIG. 1 circuit, and will be described only as to the parts which are more detailed with respect to FIG. 1.

As shown in FIG. 2, logic network 10 comprises a flip-flop 35 consisting of two NAND circuits 36, 37 and controlling a further two NAND circuits 38, 39. Circuit 36 presents three inputs: a first connected to the output of comparator 1 for receiving signal $x_o$; a second connected to line 40 extending from the output of comparator 5 and one which the inverted signal of the reset signal is present; and a third connected to the output of NAND circuit 37. NAND circuit 37 in turn presents two inputs, one connected to output Q of NAND circuit 36, and the other to the output of comparator 17 for receiving signal $x_C$.

The output of NAND circuit 36 is connected to one input of NAND circuit 38, the other input of which is also connected to line 40. The output of NAND circuit 38 is connected to one input of NAND circuit 39, the other input of which is connected to the output of comparator 1.

Adder 15 consists of a double voltage divider comprising three resistors 41–43. Resistor 41 is connected by one terminal to a common point 45 and, by the other terminal, to the device input via a switch 44, e.g. a MOS transistor, the control terminal of which is connected to line 40. Resistor 42 is connected between points 11 and 45, and resistor 43 between point 45 and ground, via a switch 46, e.g. a MOS transistor, the control terminal of which is connected to the output of NAND circuit 36.

Comparator 5 comprises a comparing element 48 with its inverting input connected to point 45, and its non-inverting input connected to voltage source 49, which simultaneously implements sources 13 and 18 in FIG. 1. The output of comparing element 48 controls a transistor 50, e.g. a bipolar transistor, having its emitter grounded and its collector connected to the input of a buffer element 51, the output of which constitutes the output terminal 52 of the device and supplies reset signal $x_R$.

Output terminal 52 is also connected to an inverting element 53, the output of which is connected to line 40 and to the control terminal of a switch 54 consisting, for example, of a MOS transistor and connected between the input of buffer 51 and ground via a further switch 55, the control terminal of which is connected to the output of logic network 10. A current source 56 is also provided between the input of buffer 51 and a supply line.

Switch 12 here consists of a voltage-follower operational amplifier having a non-inverting terminal connected to source 49, and an enabling input connected to the output of circuit 16.

The FIG. 2 circuit operates as described with reference to FIG. 1, with circuits 36–39 implementing the above logic function, and adder 15 consisting of a double voltage divider. In particular, by varying the values of resistors 41–45 it is possible to regulate constants $\alpha$ and $\beta$ of the linear combination of the input and condenser voltages. Switches 44 and 46 provide for maintaining constant the time interval required for disabling reset signal $x_R$ when the input voltage rises above the first threshold and the condenser is fully discharged. Switch 44, in fact, is opened when reset signal $x_R$ is enabled (low) and a high signal is present at the control terminal of switch 44; whereas switch 46 is opened when output signal Q from the NAND circuit 36 switches to low, which occurs when the input voltage rises above the first threshold, the reset signal is enabled (so that its inverted signal supplied to the input of circuit 36 is high), and the condenser voltage falls below the third threshold ($x_C=0$). Q remains low even when condenser voltage $V_C$ rises above the third threshold and $x_C \rightarrow 1$ until the reset signal switches to high. In this case, the inverting input of comparing element 48 only receives voltage $V_C$ during charging of the condenser. Consequently, only voltage $V_C$ is compared with the second threshold supplied by source 49, and comparing element 48 may switch to low as soon as condenser 4 reaches threshold $Th_2$. The output signal of comparing element 48 is inverted by transistor 50 and buffered by component 51 for supplying the actual reset signal.

Switches 54 and 55 provide a hysteresis of the reset signal by grounding the input of buffer 51 when the reset signal is enabled (low) and the output of logic network 10 is high, for enabling discharge of the condenser and so ensuring great reliability of the device.

The advantages of the reset device according to the present invention will be clear from the foregoing description.

The device is insensitive to reductions in input voltage for varying lengths of time depending on the amount of reduction, by virtue of the signal by which the reset signal is switched being correlated to both the absolute value of and the duration of the reduction in the input voltage.

The reset signal is practically always disabled within a given period after the input signal rises above a given threshold, by virtue of comparator 17 and logic network 10 ensuring that the condenser is always practically fully discharged, and always commences charging from a practically constant value.

After each fall in voltage, regardless of whether or not the reset signal is switches, the condenser is always charged fully by means of switch 12 controlled by circuit 16, thus enabling the device, at all times, to measure the duration of each fall in input voltage and so provide for greater reliability and correct switching of the reset signal.

The circuit may be implemented and integrated easily is flexible, and reasonable cheap to produce.

To those skilled in the art it will be clear that changed may be made to the device as described and illustrate herein without, however, departing form the scope of the present invention.

For example, adder 15 may consist of components other than those described herein; the switches may be implemented in any appropriate manner; and the logic network, may be substituted by other units, e.g. programmable devices, providing they are capable of implementing the logic function described.

I claim:

1. A reset device for a microprocessor, particularly for automotive applications, defining an input terminal and an output terminal, and comprising a first comparing stage having first and second inputs connected, respectively, to said input terminal and to a first source of a first threshold signal; a switch controlled by said first comparing stage, for switching between a closed and an open state; a capacitive element coupled to said switch and being charged and discharged depending on the state of said switch; and a second comparing stage having first input-connected to a second source of a second threshold signal, for generating a reset signal having two different logic states and supplied to said output terminal; characterised by an adding element having first and second inputs connected, respectively, to said input terminal and to said capacitive element, and including an output connected to a second input of said second comparing stage.

2. A device as claimed in claim 1, characterised by the fact that said adding element comprises means for effecting an addition of weighted sums of the input voltage supplied to said input terminal and the voltage of said capacitive element.

3. A device as claimed in claim 1, characterised by the fact that said adding element comprises a first and second resistor, each having a first terminal connected together and to the input of said second comparing stage, and a second terminal connected respectively to said input terminal and said capacitive element.

4. A device as claimed in claim 3, characterised by the fact that said adding element comprises a third resistor located between said first terminal of said first and second resistors and a reference potential line; a second switch located between said input terminal and said first resistor; and a third switch located between said third resistor and said reference potential line; said second and third switches being so controlled as to open during charging of said capacitive element.

5. A device as claimed in claim 1, characterised by a third comparing stage having first and second inputs connected, respectively, to said capacitive element and to a third source of a third threshold signal; and a logic element with a memory, having a first input connected to the output of said third comparing stage, a second input connected to the output of said first comparing stage, a third input connected to said output terminal, and an output connected to said switch for controlling the discharge of said capacitive element; said logic element controlling said switch in such a manner as to enable said capacitive element to discharge when the signal at said input terminal, having fallen below said first threshold, rises once more above said first threshold, the output signal from said adding element is below said second threshold, and said capacitive element is charged to a value above said third threshold.

6. A device as claimed in claim 5, characterised by the fact that said switch functions as a discharge control element.

7. A device as claimed in claim 5, characterised by the fact that said logic element comprises a flip-flop having a set input connected to the output of said first comparing stage, a second set input connected to said output terminal with the interposition of an inverting element, and a reset input connected to the output of said third comparing stage; said flip-flop presenting an output connected to a first input of a first NAND circuit having a second input connected to said output terminal with the interposition of an inverting element, and said first NAND circuit having an output connected to a first input of a second NAND circuit having a second input connected to the output of said first comparing stage and an output connected to a terminal controlling said switch.

8. A device as claimed in claim 1, characterised by a charge voltage source connected to said capacitive element via a further switch having a control terminal connected to the output of an enabling device for closing said further switch in the presence of an input voltage above said first threshold and an output signal supplied by said adding element above said second threshold.

9. A device as claimed in claim 8, characterised by the fact that said enabling device comprises an AND circuit having a first input connected to the output of said first comparing stage, and a second input connected to said output terminal.

10. A device as claimed in claim 8, characterised by the fact that said further switch comprises a voltage-follower operational amplifier having an input connected to said voltage source, an enabling input connected to the output of said enabling device, and an output connected to said capacitive element via a low-value resistor.

* * * * *